United States Patent [19]
Streckmann
[11] 3,913,567
[45] Oct. 21, 1975

[54] ELECTROCARDIAC INFORMATION MONITORING APPARATUS

[75] Inventor: George L. Streckmann, Dallas, Tex.

[73] Assignee: Medcraft Incorporated, Skippack, Pa.

[22] Filed: Nov. 1, 1973

[21] Appl. No.: 411,768

Related U.S. Application Data

[62] Division of Ser. No. 141,917, May 10, 1971, abandoned, which is a division of Ser. No. 811,856, April 1, 1969, Pat. No. 3,651,280.

[52] U.S. Cl. .......... 128/2.06 G
[51] Int. Cl.[2] .......... A61B 5/04
[58] Field of Search ..... 128/2.06 B, 2.06 G, 2.06 R, 128/2.05 Q, 2.05 R, 2.1 A, 2.1 R; 360/29, 360/32, 40; 329/106; 332/9 R, 15

[56] References Cited

UNITED STATES PATENTS

| | | | |
|---|---|---|---|
| 3,280,270 | 10/1966 | Allington | 128/2.06 G |
| 3,385,289 | 5/1968 | Lawson et al. | 128/2.06 R |
| 3,435,135 | 3/1969 | Yasuoka et al. | 360/29 |
| 3,603,881 | 9/1971 | Thornton | 128/2.06 R |

FOREIGN PATENTS OR APPLICATIONS

| | | | |
|---|---|---|---|
| 1,202,427 | 7/1959 | France | 128/2.06 R |

*Primary Examiner*—William E. Kamm
*Attorney, Agent, or Firm*—Fleit & Jacobson

[57] ABSTRACT

Disclosed is electrocardiographic monitoring apparatus including a magnetic tape recorder having a dual channel input for receiving and recording EKG signal information from a human being simultaneous with voice communication from that human being. The audio and EKG signals are recorded on two tracks of magnetic tape for subsequent recreation by a dual channel magnetic tape reproducer. Novel encoding and decoding circuitry are also disclosed, the circuitry employing operational amplifiers interconnected with capacitors and diodes.

2 Claims, 4 Drawing Figures

ELECTROCARDIAC INFORMATION MONITORING APPARATUS

This is a division of application Ser. No. 141,917, filed May 10, 1971 (now abandoned), which is a division of application Ser. No. 811,856, filed Apr. 1, 1969 (now U.S. Pat. No. 3,651,280, issued Mar. 21, 1972).

This invention pertains to recording and reproduction apparatus, more particularly to electrocardiographiac monitoring apparatus, and even more particularly to portable magnetic tape apparatus adapted to simultaneously record or playback EKG and audio signals.

Within the field of medical technology, and particularly within the field of medical electronics, there is an ever increasing demand for reliable monitoring and diagnostic apparatus, specifically electrocardiographic (EKG) apparatus which may be employed to determine the characteristics of the heart. Most of this apparatus to date has been fairly large and bulky necessitating the examination of the patient within an office or hospital room in which the equipment is situated.

In order for effective and reliable diagnosis to be performed, however, it is desirable, if not critical, that a continuous monitoring of EKG signals be carried out while the patient is engaged in various type activities. This continuous monitoring, however, is impossible with fixed situs monitoring equipment.

There has recently been proposed, therefore, a type of portable magnetic tape recording apparatus adapted to be worn by the person whose EKG signals are being monitored. The EKG signals are initially recorded on magnetic tape while the person is engaged in various type activities, and later played back through visual or audio display means for evaluation by the trained technician or doctor. While the apparatus offers many advantages over the fixed situs equipment, the existing models on the market are not entirely satisfactory.

It is therefore a primary object of the invention to provide improved electrocardiographic monitoring apparatus utilizing recording means adapted to be worn or carried about by the person whose EKG signals are being monitored.

It is another object of the invention to provide EKG monitoring apparatus which can simultaneously record or playback EKG signals as well as voice communications information from the patient indicating in what type of activity he is engaged while these EKG signals are being produced.

It is a further object of the invention to provide novel encoding means for modulating an electrical signal, the encoding means particularly adapted for incorporation into a portable magnetic tape recorder, the modulator being unaffected by variations of tape speed.

It is a still further object of the invention to provide novel circuitry for the decoding of reproduced signals in the play-back portion of magnetic tape apparatus.

In accordance with these and other objects, the present invention is primarily directed to apparatus for recording and/or reproducing electrocardiac signals obtained from a human being simultaneous with the recording and/or reproduction of audio signals representative of the voice communication of that human being. The audio signal and EKG signal are respectively recorded initially on two tracks of a magnetic tape, the information on the magnetic tape being played back at a later time. Encoding circuitry embodied within the recorder modulates the electric signal containing the cardiac information to an output signal comprising a series of positive and negative pulses, the ratio of the width of the negative pulse to the width of the positive pulse being proportional to the amplitude of the said electrical signal. Decoding circuitry within the reproducer effectively restores the reproduced EKG signal from the magnetic tape to the same waveshape as the modulated signal within the recorder.

Additional features as well as other advantages and objects of the invention will become readily apparent from the following detailed description taken in conjunction with the accompanying drawing, wherein.

Figure 1:
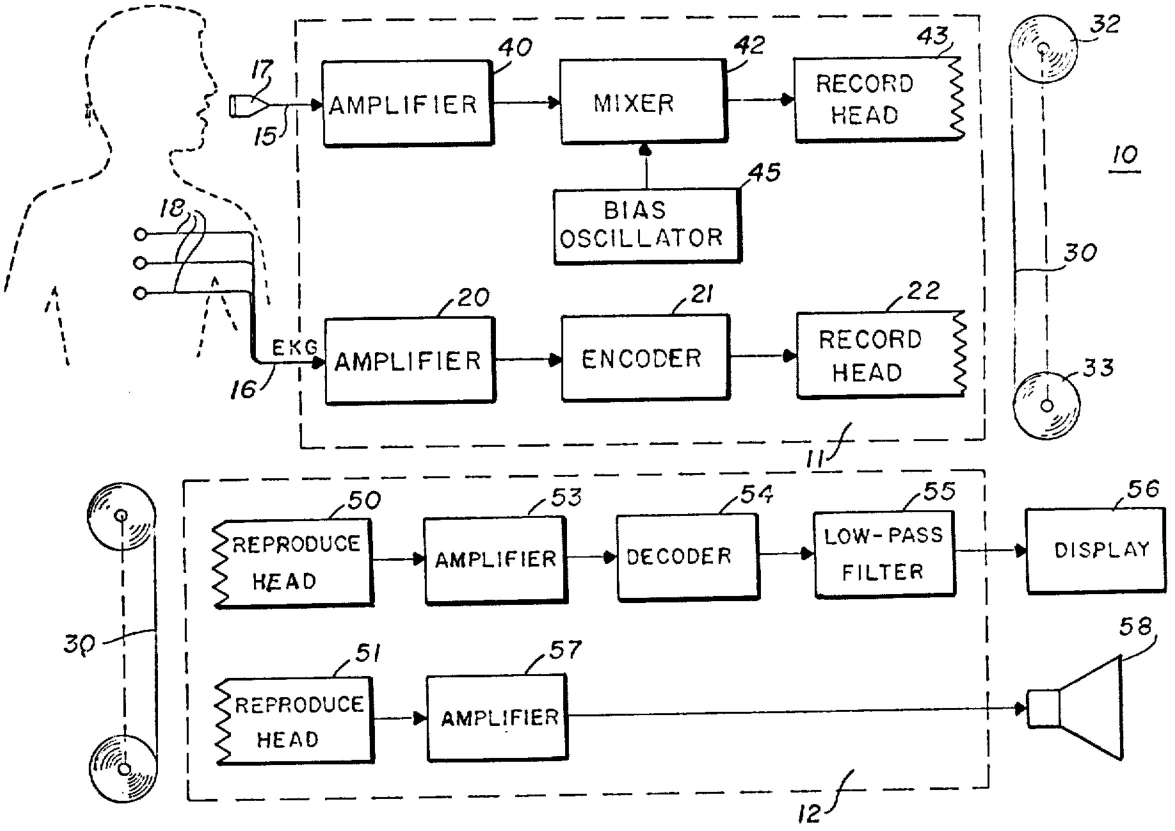
FIG. 1 is the block diagram schematic of the record and reproduce portions of the apparatus of the invention.

Referring now to FIG. 1, the electrocardiograph means 10 embodying the invention includes a record portion 11 and a reproduction or play-back portion 12. Both the record and play-back portions are essentially dual channel systems for respectively recording and playing back both EKG signal information monitored from a patient simultaneous with voice communication from that patient.

The record portion 11 of the electrocardiograph means 10 is embodied within a portable magnetic tape recorder which is designed to be worn or carried by the patient whose EKG signals are being monitored. The recorder is therefore sufficiently small and compact that the patient may carry it about while engaging in normal or controlled activites. Dual channel inputs 15 and 16 are respectively coupled to a microphone 17 for receiving voice communication from the user; and a plurality of conductors 18 which are electrically connected to one or more electrodes disposed in specified locations upon the patient's skin, as observed in FIG. 1. This dual channel input arrangement thus allows the monitoring of the EKG signals being produced while the patient is engaged in specific activity, as well as a simultaneous voice recording by the patient indicating what type of activity is then being carried on.

The EKG signal, as it appears within the channel 16, has the widely known waveform which includes a P wave which is normally a small positive pulse corresponding to the initial impulse triggering the commencement of the heart beat; a QRS complex coinciding with the actual expansion and contraction of the cardiac muscle producing the pumping action of the heart; and a T wave representing the end of the heart beat.

The EKG wave within the channel 16 is fed or coupled to an amplifier 20 of conventional design which desirably amplifies all of the frequency components in the EKG signal with a minimum of distortion, thereby to provide a signal at the output of the amplifier 20 which is a faithful reproduction of the EKG signal, although of increased amplitude. The output of the amplifier 20 is coupled to an encoder 21 which converts or modulates the amplifier EKG signal to a carrier signal form suitable for recording directly onto the magnetic tape 30. The characteristics and the design of the encoder means 21 constitutes a novel feature of the invention, and will be described in more detail below.

The output of the encoder is thereafter electrically connected to a record head 22 which is adapted to record the resulting encoded signal on one of two side-by-side tracks located on the magnetic tape 30. The particular type of magnetic tape transport is not critical to the invention, and may include one of a variety of systems presently on the market. In the illustration shown in FIG. 1, the magnetic tape 30 is advanced by way of supply and take-up reels 32 and 33, respectively.

Simultaneous with the recording of the EKG signal, an audio signal representative of the voice communication of the patient is transmitted from the microphone 17 through the channel 15 to the amplifier 40. The amplifier audio signal thereafter passes through a conventional mixer 42 coupled to a bias oscillator 45 and the resulting signal is recorded by way of the record head 43 upon a second track of the magnetic tape 30. The record heads 22 and 43 are appropriately spaced with respect to the magnetic tape 30 to provide a correlation between the information contained in the recorded EKG signal and the information contained in the audio signal. Consequently, the patient whose EKG signals are being recorded may orally indicate what type activity he is engaged in which is producing the particular EKG signals.

The reproduction portion 12 of the electrocardiac tape recorder 10 also comprises a dual channel system for converting the audio and EKG signal information which has been recorded on the tape 30 into readable and useable form. Accordingly, a pair of play-back or reproduce heads 50 and 51 simultaneously scan the two tracks on the magnetic tape 30 to play back the recorded EKG signal and the audio signal respectively.

The reproduce head 50 is electrically coupled to the input of the amplifier 53, the amplifier boosting the received signal to a useable level. It has been observed that the reproduction of the recorded EKG signal by the reproduce head 50 produces an output signal from the head 50 which is not only a derivative of the originally recorded signal, but includes considerable distortion and "drop out" due to the irregularities introduced by the tape movement and by imperfections of the oxide coating of the tape. The output of the amplifier 53 is therefore coupled to a decoder 54 which effectively restores the amplified signal to essentially the same wave shape of the output signal from the encoder 21 in the record portion. The decoder 54 is, in itself, of novel design, and constitutes a particular feature of the invention, and will be described in greater detail below.

The output signal from the decoder 54 is thereafter passed through a low pass filter 55 of conventional design, the resultant output signal then being of substantially the same wave shape as the originally monitored EKG signal within the channel 16. The output of the filter 55 is thereafter coupled to display means 56, which may be a cathode ray oscilloscope or strip chart recorder, for example, for visual presentation of the originally recorded EKG signals.

Simultaneous with the reproduction of the recorded EKG signals is the reproduction of the recorded audio signals. Accordingly, the recorded audio information is reproduced by way of play-back head 51, and subsequently amplified and shaped by conventional amplifier 57, where the resultant signal is coupled to a loud speaker or earphone means 58. As a consequence of the simultaneous reproduction and display of the EKG and audio signals, a doctor or technician, for example, is able to more meaningfully evaluate the EKG information since he is simultanelously receiving a vocal transmission of the type of activity in which the patient was engaged during the monitoring of the EKG signals.

The record function of the monitored EKG signals requires the modulation or encoding of the signal at the output of the amplifier 20 to a form which is suitable for recording directly onto the magnetic tape 30. To effectively accomplish this purpose, the encoding means 21 must be able to modulate or encode the low frequencies ordinarily associated with the EKG information signal. In addition, however, the record apparatus 11 is specifically adapted to be worn or carried by a patient while being engaged in various activities; consequently the continual movement of the recorder results in variations in the speed of the tape. As a result, any encoding approach which employs frequency modulation will introduce undesirable distortion to the output signal.

In accordance with a specific feature of this invention, therefore, the encoder 21 is so designed to be independent of the rate of travel of the magnetic tape itself, i.e. the modulation technique is independent of frequency variations. The novel design of this encoder is illustrated in detail in FIG. 2 wherein an operational amplifier 70 of the type generally known in the art has its negative input terminal coupled through the resistor $R_1$ to the terminal A, and the positive input terminal of the operational amplifier 70 is connected to ground through the resistor $R_3$. Resistors $R_2$ and $R_4$ provide positive and negative feed back resistance, respectively. The capacitor $C_1$ connects the negative input terminal of the operational amplifier to ground, as illustrated.

Figure 2:
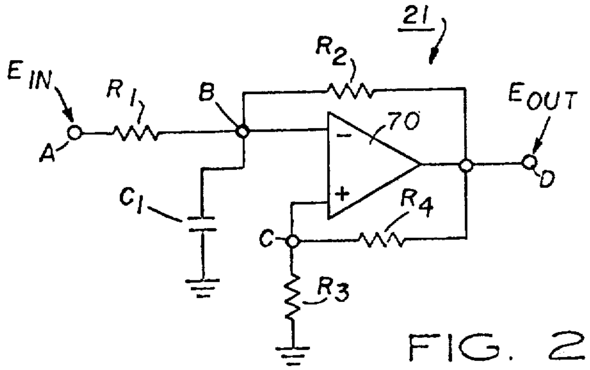
FIG. 2 is the circuit schematic of the novel encoder incorporated within the record portion of the apparatus illustrated in FIG. 1.

There is now described the operation of the circuit of FIG. 2. Assume the voltage $E_{OUT}$ at the output terminal D is positive by an amount (+V). Under this condition, the voltage at the terminal C will be equal to $(R_3/R_3 + R_4)$ V. As the capacitor $C_1$ charges, the voltage at the terminal B moves toward a maximum value equal to $[(R_1/R_1 + R_2)(V - E_{IN}) + E_{IN}]$. However, when the voltage at terminal B becomes equal to the voltage at terminal C, the output voltage $E_{OUT}$ becomes −V due to the regenerative action of the operational amplifier 70, and the voltage at terminal C now becomes $-V(R_3/R_3 + R_4)$. The capacitor now begins to charge in an opposite direction to drive the voltage at the terminal B toward a value equal to $[(R_1/R_1 + R_2)(-V - E_{IN}) + E_{IN}]$, but when the voltage at terminal B equal the voltage at terminal C, the output voltage $E_{OUT}$ again becomes +V, and the cycle repeats.

If the signal at the input terminal $A(E_{IN})$ is positive, the charging rate of the capacitor $C_1$ is faster during the time the output voltage $E_{OUT}$ is positive than when the output voltage is negative. In other words, for a positive input signal, $E_{IN}$, the positive pulse width at the output of encoder 21 is shorter than the negative pulse width. On the other hand, if the input signal $E_{IN}$ is negative, the reverse is true, and the positive pulse width at the encoder output is longer than the negative pulse width. When the signal is zero at the input terminal A, the capacitor charges at an equal rate for the positive and negative output cases, and the positive and negative output pulse widths are thereby equal. Thus, the ratio of the negative to positive pulse widths at the output of the encoder 21 is proportional to the amplitude of the input signal, $E_{IN}$ at the input terminal A; and the output signals from the encoder 21 are essentially independent of frequency changes due to the variations in tape speed of the magnetic tape 30. This encoding technique provided by the circuit 21 can be referred to as pulse width ratio modulation.

Figure 3:
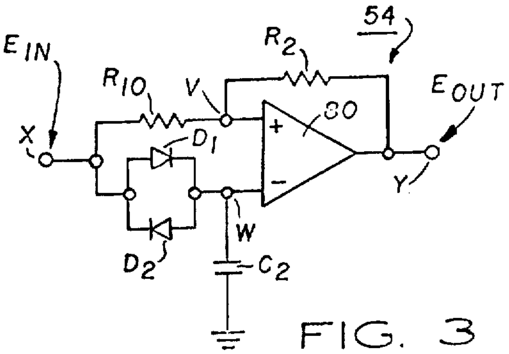
FIG. 3 is the circuit schematic of the novel decoder incorporated within the playback portion of the apparatus illustrated in FIG. 2.

Referring now to FIG. 3, there is described the novel circuitry embodied in the decoder 54. It is to be noted that the signal reproduced by the play-back head 50 is a function of the magnetic recordings traveling past this head; consequently, the signals fed into and through the amplifier 53 are actually derivatives of the encoded EKG signals on the tape 30. In addition, due to imperfections and bumps on the tape itself, there is additional distortion or drop out associated with the amplified output signal from the amplifier 53. Before this signal is passed through the low pass filter 55, therefore, a decoding function must be performed to restore this amplified signal to essentially the same wave shape of the output signal from the encoder 21.

Figure 4:
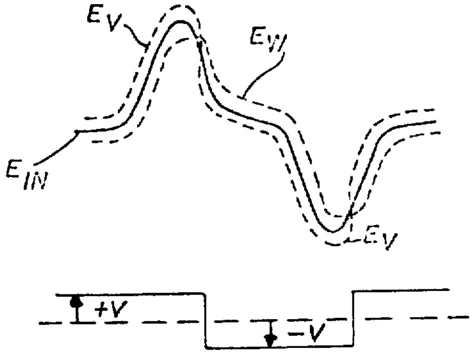
FIG. 4 is a graph of the output signal of the decoder illustrated in FIG. 3 as a function of input signal.

Accordingly, an operational amplifier 80 has its positive input terminal connected through a resistor $R_{10}$ to the input terminal X, and its negative input terminal connected through a paralled combination of diodes $D_1$ and $D_2$ to the input terminal X. A feed-back resistor $R_2$ is connected between the output terminal Y and the terminal V, and the capacitor $C_2$ is connected to ground from the terminal W. The operation of this circuit can be described as follows. With the presence of positive input signal $E_{IN}$ at the terminal X, the output signal $E_{OUT}$ at the terminal Y is +V and remains constant until the voltage $E_v$ at the terminal V drops just below the voltage present at the terminal W. At this point, the output pulse $E_{OUT}$ becomes −V and remains −V until the voltage $E_v$ at terminal V once again exceeds the voltage $E_w$ at terminal W. This output pulse $E_{OUT}$ is illustrated in FIG. 4 for the stated conditions of the input signals $E_{IN}$, and voltages at terminals V and W, the resulting signal thereafter coupled to the filter 55.

It may thus be seen that electrocardiac monitoring apparatus has been provided which includes a compact and portable magnetic tape recorder adapted to be worn by the individual from which the EKG signals are received, the recorder having the capability of simultaneously recording the EKG signal information as well as audio signals representative of the voice communication from the patient about the type of activity he is engaged in. The reproduce portion has the capability of simultaneously playing back the EKG signal and audio information to enable a more effective evaluation of the characteristics of the patient's heart. It is to be specifically pointed out that, while the novel circuitry of the encoder 21 and decoder 54 is particularly suited for incorporation within the overall monitoring apparatus, they are not limited to such use and may be employed whenever electrical signal modulation or demodulation is desired.

Various other modifications and changes may be made to the disclosed embodiments of the invention by persons skilled in the art without departing from the spirit and scope of the invention as defined by the appended claims.

What is claimed is:

1. Apparatus for monitoring cardiac information about a human being, comprising:

a. record means having two channels,
b. one of said two channels including transducer means for converting voice communication from said human being into representative audio signals,
c. means coupled to said transducer means for recording said audio signals onto one track of a magnetic tape,
d. the other of said two channels including electrode means adapted to be affixed to said human being for producing electrocardiac signals,
e. encoding means for modulating said electrocardiac signals to produce output signals from said encoding means comprising a series of constant magnitude positive and negative pulses, the ratio of the width of the negative pulses to the width of the positive pulses being proportional to the amplitude of the said electrocardiac signals, said encoding means comprising an input terminal coupled to said electrode means, an output terminal, a capacitor, an operational amplifier having its input connected to said input terminal and its output connected to said output terminal with the negative input terminal of the operational amplifier coupled to ground through said capacitor, and a pair of feedback resistors respectively coupled from the output of the operational amplifier to the negative and positive inputs of said operational amplifier,
f. means for recording said modulated output signals onto another track of said magnetic tape,
g. reproduce means having two channels,
h. a first playback head within one of said reproduce channels for reproducing said audio signals on said one track of said magnetic tape,
i. loudspeaker means coupled to said playback head for recreating said voice communication,
j. a second playback head for reproducing signals from said second track of said magnetic tape,
k. decode means coupled to said second playback head for effectively restoring the said reproduced signals from the second track to the same waveshape as the said modulated output signals from the encoding means,
l. filter means for converting said restored signals to electrocardiac signals of the type produced by said electrode means, and
m. means coupled to said filter means for displaying said electrocardiac signals.

2. The apparatus as described in claim 1 wherein said decode means comprises an input and output terminal, a second capacitor, an operational amplifier having its input coupled to the input terminal of said decode means and its output coupled to said output terminal, with the negative input terminal of the operational amplifier of the decode means coupled through said second capacitor to ground, a feedback resistor coupling the output terminal of the second-mentioned operational amplifier to the positive input terminal thereof, and a paralleled set of diodes coupled to said input terminal and to the negative input terminal of said second-mentioned operational amplifier.

* * * * *